United States Patent [19]

Luke

[11] Patent Number: 4,902,153
[45] Date of Patent: Feb. 20, 1990

[54] CONTROL FOR FOAM BRUSH FOR COIN OPERATED CAR WASH

[76] Inventor: Milton Luke, 6911 Station Rd., Erie, Pa. 16510

[21] Appl. No.: 102,661

[22] Filed: Sep. 30, 1987

[51] Int. Cl.⁴ .......................................... B43K 23/02
[52] U.S. Cl. .................................... 401/131; 401/289; 401/195; 134/201; 239/283
[58] Field of Search .............. 194/254, 255, 904, 247, 194/260, 262, 241; 221/125, 126, 151; 401/289, 131; 222/2; 220/334; 134/123, 56 R, 201; 239/282, 283; 232/41 D, 41 E; 206/361, 362.3, 15.2, 15.3

[56] References Cited

U.S. PATENT DOCUMENTS

| | | | |
|---|---|---|---|
| 2,875,922 | 3/1959 | Hsu et al. | 221/125 |
| 3,151,774 | 10/1964 | Payne | 221/125 |
| 3,168,984 | 2/1965 | Corning et al. | 401/131 |
| 3,199,739 | 8/1965 | Corning et al. | 401/131 |
| 3,229,703 | 1/1966 | Thompson et al. | 134/123 |
| 3,330,394 | 7/1967 | Koch | 194/260 |
| 3,361,507 | 1/1968 | O'Neil | 206/361 |
| 3,400,725 | 9/1968 | Miller et al. | 134/123 |
| 3,933,231 | 1/1976 | Vinet | 194/241 |
| 3,966,033 | 6/1976 | Doo | 194/247 |
| 4,174,810 | 11/1979 | Torbett | 239/283 |
| 4,306,678 | 12/1981 | Schull | 239/283 |
| 4,512,814 | 4/1985 | Buck | 134/42 |

Primary Examiner—Richard J. Apley
Assistant Examiner—David F. Crosby
Attorney, Agent, or Firm—Ralph Hammar

[57] ABSTRACT

A brush holder for unattended car wash bays which releases the brush for the period paid for by coin deposits and locks the brush upon termination of that period.

18 Claims, 2 Drawing Sheets

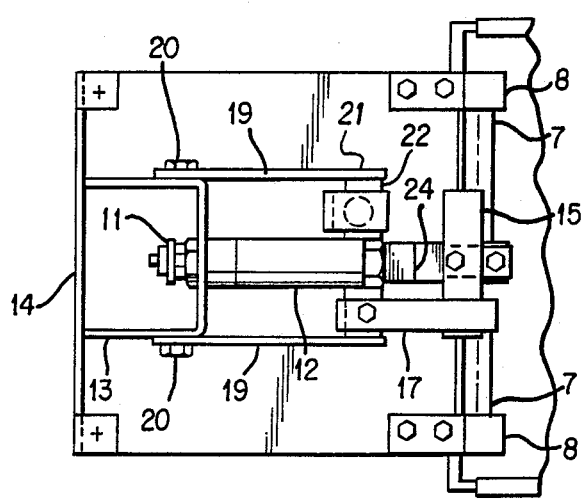
FIG. 1
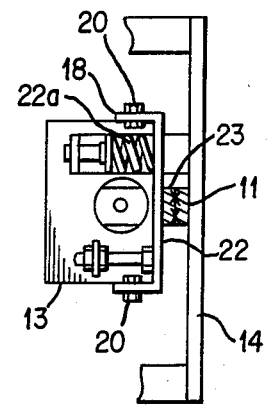
FIG. 2
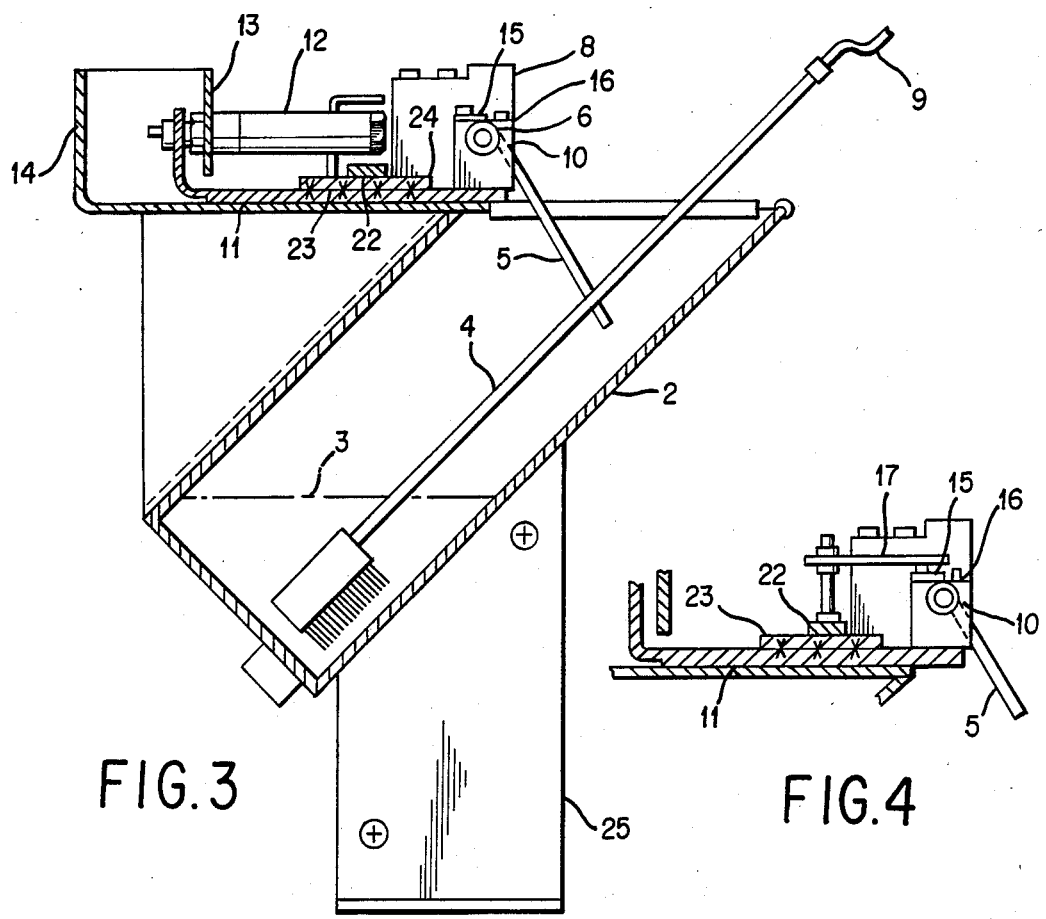
FIG. 3
FIG. 4

CONTROL FOR FOAM BRUSH FOR COIN OPERATED CAR WASH

Coin operated car wash bays, which may be used for long periods of time unattended, have been equipped with foam brushes (brushes which discharge foam) for loosening road stains before finishing the wash with a high pressure rinse.

This invention is a control which maximizes the availability of the wash bay by releasing the brush for the period of time paid for by coin deposits and locking the brush after termination of that period.

In the drawing,

FIG. 1 is a top plan view of a foam brush control in locked condition,

FIG. 2 is a side elevation of FIG. 1 partly broken away,

FIG. 3 is a section on line 3—with the brush locked, and FIG. 4 is a view of the control in the locked position

Figure 6:
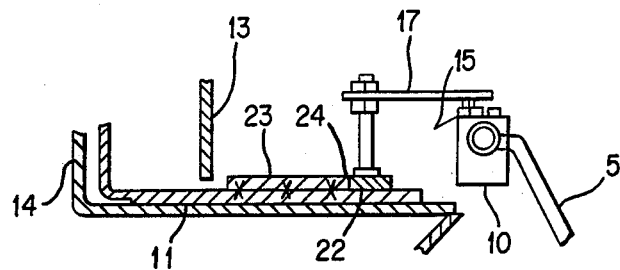

In the locked condition of FIGS. 1, 2 and 4 the brush 1 rests at the bottom of an inclined chamber 2 holding continuously running water up to level 3 to keep the bristles of the brush soft and clean and to prevent freezing in winter. The brush handle 4 extends out between two spaced prongs 5 fixed to a stainless steel tubular shaft 6 having opposite ends 7 journaled in supports 8 of impact resistant plastic. When the bush is "on", a hose 9 conducts to the brush a detergent water solution which is discharged from the brush as foam.

Figure 5:
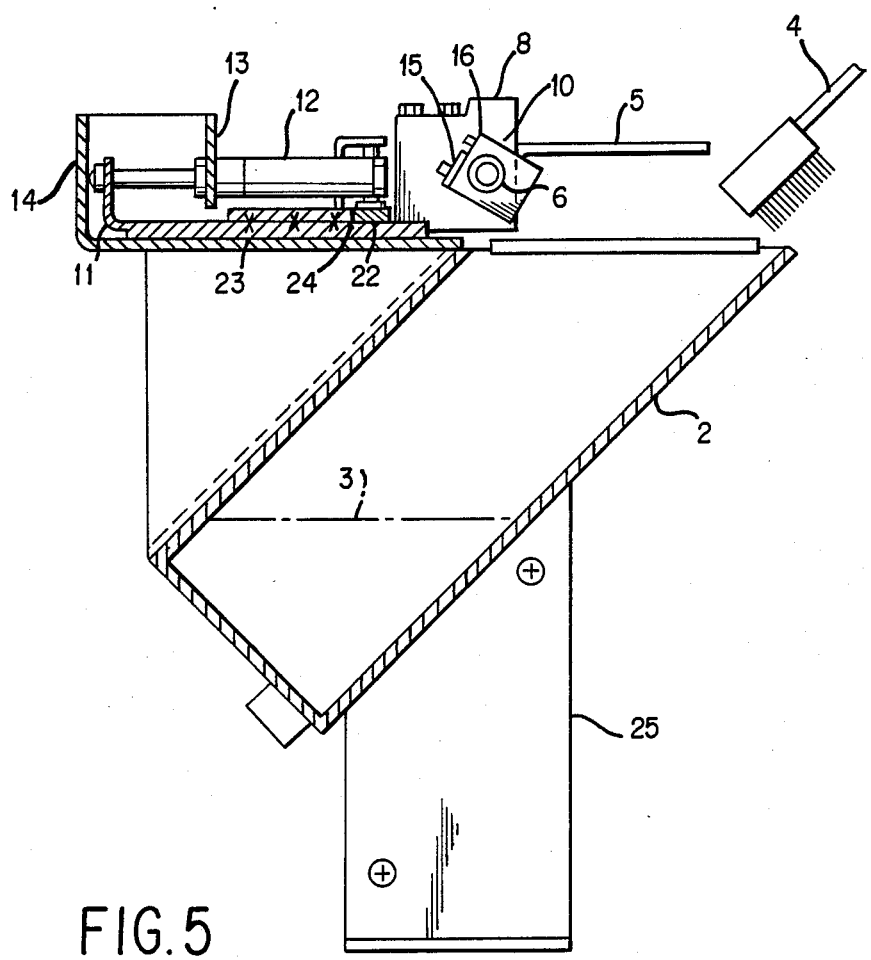
FIG. 5 is a section showing the brush unlocked and the detergent "on" and FIG. 6 is a view showing the detergent "off" and the control ready to lock in the brush as soon as the brush is returned to the chamber.

The lock for the brush comprises a non-circular (rectangular) cam 10 fixed to the shaft 6 and cooperating with a slide 11 to block rotation of the shaft 6. While rotation of the shaft is blocked, the prongs 5 prevent removal of the brush. Slide 11 is positioned by a two-way air cylinder 12 mounted on bracket 13 on supporting structure 14 at the upper side of the chamber 2. In the locked or forward position shown in FIGS. 3 and 4, the slide 11 blocks rotation of the cam and in the retracted position of the slide shown in FIGS. 5 and 6 the cam in unblocked.

When coins are deposited for use of the brush, the flow of the detergent starts and the cylinder 12 retracts the slide to unlock the brush. When the time paid for runs out, the flow of detergent stops and cylinder urges the slide forward to the locked position. The user gets the full time paid for.

The retraction of the slide 11 is wholly under the control of the cylinder 12. As soon as the coins are deposited, the cylinder is actuated to retract the slide and the slide is immediately retracted. There are no obstacles to retraction of the slide 11 The advancing of the slide toward the lock position is under the control of the cam 10 and the associated structure. The cam has a rigid arm 15 secured to the flat top 16 of the cam (FIGS. 1 and 3) and having its free end projecting beneath a rigid member 17 secured to a U-shaped frame 18 having side arms 19 pivoted at 20 on the bracket 13 fixed to structure 14 and having forward ends 21 connected by a cross member 22 extending beneath the forward end of the cylinder 12. The cross member is urged down by hold down spring 22a (FIG. 2) against the upper surface of a plate 23 (FIG. 3) fixed to the slide 11. In the retracted position (FIG. 5) the front end 24 of the plate 23 is behind the cross member 22 of the U-shaped frame 18. Mere energizing of the air cylinder 12 in the direction to move the slide 11 to the locking position would result in stopping the front end 24 of the plate 23 against the back edge of the cross member 22. In order to move the slide 11 to the locking position, it is necessary to pivot the cam 10 clockwise as viewed in FIG. 5 by insertion of the brush 1 into the container. Inserting the brush into the container pivots the cam 10 in a clockwise direction as viewed in FIG. 5 and causes arm 15 fixed to cam 10 to lift the U-shaped frame 18 until the back edge of the cross member 22 clears the front end 24 of the plate 23 fixed to the upper surface of the slide 11. Pivoting the prongs 5 in a counterclockwise direction, as viewed in FIG. 5 such as would occur when the brush is being removed from the container would not have this action because the rigid member 15 fixed to the upper surface of the cam is offset from the center line of the cam as shown in FIGS. 1, 3 and 4 so that no significant lifting of the front end of the U-shaped frame member could take place if the cam 10 were rotated in a counterclockwise direction (FIG. 4). By this arrangement, the brush is locked in the container as soon as it is returned to the container after the expiration of the time paid for by the coins.

The shut off of the detergent solution takes place as soon as the time paid for by the coins runs out. The locking of the brush in the container may take place after the time has run out in order to give the user a chance to finish the brushing prior to starting the high pressure clear water rinse which finishes the washing operation.

The control for the car wash including the coin receiver are in a locked cell not accessible to the user of the car wash. Since the car wash is unattended for long intervals of time, the brush control must be designed to stand the kind of abuse which unattended devices suffer. The parts are ruggedly constructed to withstand maximum forces and the moving parts have a minimum of looseness or play which would encourage destruction by users. The brush control unit may be solidly mounted on a building wall by bolting one of the brackets 25 to the wall.

The brush control unit is connected at all times to compressed air, detergent and water lines. In the "off" position, the compressed air applied to cylinder 12 is in the direction to advance slide 11 to the position locking the brush 1 in the chamber 2 and the detergent line to the brush is "off".

When the proper coins are inserted, the coin control turns the brush unit "on" for the time interval paid for and "off" at the end of that interval. In the "on" position, the compressed air supplied to cylinder 12 is in the direction to retract the slide 11 and unlock the brush and the detergent line to the brush is "on".

I claim:

1. A self-service car wash bay comprising
a brush having a line for supplying a liquid detergent solution to the brush,
a holder for the brush,
means for locking the brush in the holder,
and coin controlled means for turning the said line "on" and said locking means "off" at the beginning of an interval paid for by coin deposit and for turning said line "off" and said locking means "on" at the end of said interval.

2. The structure of claim 1 in which the brush receives the detergent solution and discharges the same as foam.

3. The structure of claim 1 in which the brush has a tubular handle receiving the liquid detergent solution from said line and supplying the same to the brush.

4. The structure of claim 1 in which the brush holder is a chamber through which water is circulated to maintain a level submerging the bristles of the brush to maintain the bristles soft and clean and to prevent freezing.

5. The structure of claim 1 in which the brush has a head and a handle extending from the head and the locking means comprises
    prongs straddling said handle and extending from a rock shaft which is blocked from rotation to lock the brush in the holder.

6. A coin controlled car wash comprising
    a brush having a line for supplying a liquid detergent solution to the brush which delivers the solution as foam, said brush having a tubular handle receiving the liquid detergent solutin from said line and supplying the same to the brush,
    a holder for the brush having a chamber through which water is circulated to maintain a level submerging the bristles of the brush to maintain the bristles soft and clean and to prevent freezing,
    means for locking the brush in the holder, having prongs straddling said handle and extending from a rock shaft which is blocked from rotation to lock the brush in the holder,
    coin controlled means for turning the said line "on" and said locking means "off" at the beginning of an interval paid for by coin deposit and for turning said line "off" and said locking means "on" at the end of said interval, said locking means having a cam on the rock shaft which cooperates with a slide to block rotation of the shaft and thereby lock the brush in the holder.

7. The structure of claim 6 in which the brush is unlocked by retracting the slide away from said cam.

8. The structure of claim 6 in which the slide is controlled by a two-way air cylinder which retracts the slide to unlock the brush and advances the slide to lock the brush.

9. The structure of claim 8 in which the slide is beneath the air cylinder.

10. The structure of claim 9 in which the slide is held down by a spring biased cross member.

11. The structure of claim 10 in which movement of the slide toward the locked position is stopped against the cross member short of the locked position.

12. The structure of claim 11 in which insertion of the brush in the holder cams the cross member clear of the slide to unblock movement of the slide to the locked position.

13. A car wash apparatus having a line for supplying a liquid detergent solution to a brush which discharges the same as foam, a bucket receiving said brush, locking means for locking the brush in the bucket,
    and coin controlled means for turning the said line "on" and said locking means "off" at the beginning of an interval paid for by coin deposit and for turning said line 'off' and said locking means 'on' at the end of said interval.

14. The structure of claim 13 in which at the end of said interval a means for restoring the locking means sets the locking means in condition to be locked in the bucket by subsequent return of the brush into the bucket.

15. A coin controlled car wash having a holder for a brush with a tube feeding a solution of detergent and water to the brush which discharges the solution as foam, a means for locking the brush into a holder when the solution is off and for unlocking the brush when the solution is on comprising a double acting cylinder having on and off modes, a rock shaft with a cam fixed thereto, prongs extending from said rock shaft, and a slide moved into locking relationship with the cam in one mode of the cylinder and out of locking relationship with the cam in the other mode of cylinder.

16. The structure of claim 15 plus a spring hold down means for said slide having a part bearing on said slide.

17. The structure of claim 16 plus means for lifting said part away from said slide to free the slide for movement relative to said part.

18. The structure of claim 17 plus lifting means activated by rotation of said rock shaft in one direction but not by rotation in a direction opposite said one direction.

* * * * *